United States Patent [19]

Mai

[11] Patent Number: 5,221,392
[45] Date of Patent: Jun. 22, 1993

[54] PROCESS FOR MAKING RUBBER TRACKS AND RUBBER TRACK MADE THEREBY

[75] Inventor: Renato Mai, Verona, Italy
[73] Assignee: MAI S.p.A., Verona, Italy
[21] Appl. No.: 564,827
[22] Filed: Aug. 9, 1990
[30] Foreign Application Priority Data
Sep. 21, 1989 [IT] Italy ................. 84980 A/89
[51] Int. Cl.$^5$ .................. B65H 81/00; D01H 7/02
[52] U.S. Cl. ........................ 156/184; 156/91;
156/123; 156/130; 156/143; 156/169; 156/187;
156/191; 156/244.11; 156/245; 57/13; 57/62;
57/291; 57/311; 242/7.02; 305/38; 264/176.1;
264/177.2; 264/241; 264/503; 264/540;
264/522
[58] Field of Search ............. 428/156, 159, 164, 295,
428/357; 305/30, 35 EB, 38, 35 R; 156/96, 117,
130, 184, 187, 91, 123, 143, 169, 191, 244.11,
245, 296; 152/187, 185.1; 264/176.1, 177.2, 241,
503, 540, 552; 242/7.02; 57/6, 13, 62, 297, 311

[56] References Cited
U.S. PATENT DOCUMENTS

| 2,387,802 | 10/1945 | Mayne ..................... 305/10 |
| 2,845,308 | 7/1958 | Woltemar .................. 305/10 |
| 3,582,154 | 6/1968 | Russ ..................... 305/35 EB |
| 3,874,982 | 4/1975 | Marzocchi et al. ............. 428/295 |
| 4,714,302 | 12/1987 | Svensson et al. ............ 305/35 EB |
| 4,783,230 | 11/1988 | Perkins .................... 156/130 |

FOREIGN PATENT DOCUMENTS 2323765 11/1974 Fed. Rep. of Germany .
61217 6/1970 Luxembourg .
544711 4/1942 United Kingdom .
2104015 3/1983 United Kingdom .......... 305/35 EB

OTHER PUBLICATIONS

Gummibefreiung. vol. 54, No. 12, Dec. 1978, pp. 44-45.

Primary Examiner—Donald J. Loney
Attorney, Agent, or Firm—Browdy and Neimark

[57] ABSTRACT

The described process comprises the following operating steps: an extrusion step in which the raw rubber is extruded in the form of a strip (7) from an appropriate machine (1); a winding step in which the rubber strip (7) is wound about a rotating drum (2); an insert application step in which steel insert pieces (16) are applied to the rubber layer wound about the rotating drum (2); a second winding step in which the rubber strip (7) is wound on the steel insert pieces (16); a coiling step in which a steel wire (4) is wound into spiral shape on the rubber layer wound about the rotating drum (2); a third winding step in which the rubber strip (7) is wound on the coiled steel wire (4) as far as a product in the form of a ring is achieved; a removal step in which the ring-shaped produce is removed from the drum (2); an introduction step in which the ring-shaped product is introduced into a mold; a forming and vulcanization step carried out on the product in the mold; an extraction step in which the ready track is withdrawn from the mold. The track exhibits a constant transverse section over the whole endless extension thereof and is provided with a metal core located inside it and consisting of at least a steel wire band made of a single steel wire (4) wound into spiral.

2 Claims, 2 Drawing Sheets

PROCESS FOR MAKING RUBBER TRACKS AND RUBBER TRACK MADE THEREBY

BACKGROUND OF THE INVENTION

1. Field of the Invention

The present invention relates to a process for making rubber tracks and to a rubber track made thereby.

The concerned tracks consist of a rubber strip comprising an inextensible core made up of longitudinally disposed steel wires, and of a series of strengthening steel insert pieces positioned at locations where tracks rest on the ground. The steel wires and insert pieces are buried into the rubber strip externally exhibiting suitably shaped ridges (as well as on the inner side thereof), depending upon the requirements of use and the type of ground on which the track-laying vehicle must work.

2. Prior Art

Presently, in accordance with the known art, the production of rubber tracks involves the use of a rectilinear rubber strip having a predetermined length and containing one or, more often, two series of steel wires which are disposed inside the strip in coplanar relation with the strip itself on either side of the central area thereof. The steel wires are in the form of cut-down sizes the length of which corresponds to the length of the rubber strip, and are disposed parallelly to one another.

In order to make the track acquire a ring shape, the rubber strip is bent and the two strip ends are overlapped over a certain length thereof. Such ends are then joined by means of an adhesive and by molding vulcanization. The ends of the steel wires therefore are not welded together but are only overlapped, buried into the rubber strip in the junction area of the latter.

As a result, in the junction area the rubber strip becomes thicker and therefore its profile appears uneven, which brings about two main drawbacks.

First of all, during the passage onto the track's toothed wheel said junction area behaves stiffly and consequently the homogeneity of movement is reduced.

In addition, at the point where there is a variation in the track section, the material exhibits a change in strength. It is known, in fact, that the areas concerned with a section variation constitute critical fatigue points where the material is preferably more subjected to stress decay.

SUMMARY OF THE INVENTION

Consequently it is an object of the present invention to overcome the above mentioned drawbacks hitherto present in the known art by providing a process for making rubber tracks which is capable of producing a track having a constant transverse section, measured at the bottom of the shaped ridges, over the whole endless extension thereof and in which the inextensible metal core consists of a continuous steel wire wound into spiral shape along the ring forming the track.

It is a further object of the present invention to provide a process of relatively simple and reliable execution.

The foregoing and still further objects are attained by a process comprising the following operating steps: an extrusion step in which the raw rubber is extruded in the form of a strip from an appropriate machine; a winding step in which the rubber strip is wound about a rotating drum; an insert application step in which steel insert pieces are applied to the rubber layer wound about the rotating drum; a second winding step in which the rubber strip is wound on the steel insert pieces; a coiling step in which a steel wire is wound into spiral shape on the rubber layer wound about the rotating drum; a third winding step in which the rubber strip is wound on the coiled steel wire as far as a product in the form of a ring is achieved; a removal step in which the ring-shaped product is removed from the drum; an introduction step in which the ring-shaped product is introduced into a mold; a forming and vulcanization step carried out on the product in the mold; an extraction step in which the ready track is withdrawn from the mold.

The produced track exhibits a constant transverse section over the whole endless extension thereof and is provided with a metal core located inside it and consisting of at least a steel wire band made of a single steel wire wound into spiral.

BRIEF DESCRIPTION OF THE DRAWINGS

Further features and advantages of the invention will become more apparent from the detailed description of a preferred embodiment given hereinafter by way of non-limiting example, with reference to the accompanying drawings in which.

DESCRIPTION OF THE PREFERRED EMBODIMENT

Figure 1:
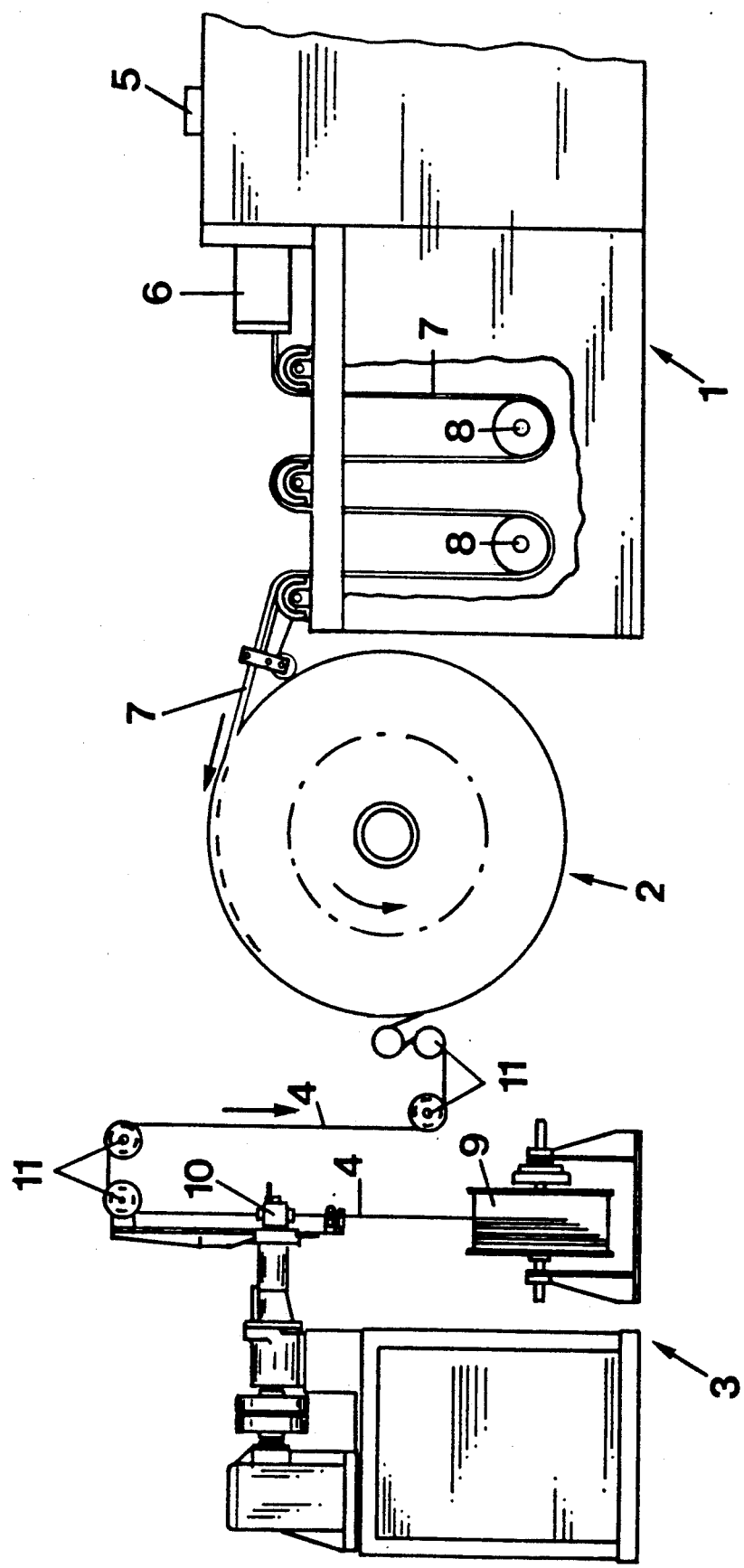
FIG. 1 diagrammatically shows part of an apparatus to be used for carrying out the process of the invention.

Referring particularly to FIG. 1 a machine designed to carry out the rubber mixing has been generally identified by reference numeral 1, while 2 denotes a drum rotating about a horizontal axis the sense of rotation of which is shown by an arrow in FIG. 1, and 3 denotes a feed group for the feeding of the steel wire 4.

The process for making the rubber track substantially comprises two stages: one manufacture stage in which a ring-shaped product made up of raw rubber is produced and a second vulcanization stage in which the product is suitably cured within a suitable mold in which the rubber hardens and acquires the necessary elasticity features, and the shaped ridges are formed.

The above stages consist of the operating steps set forth hereinafter.

A first step in which the raw rubber, introduced via a loading opening 5 into the machine 1 where it is submitted to mixing, is drawn through an extruder 6. The rubber takes therefore the form of a continuous strip 7 of predetermined thickness and width, which is passed over idler rollers 8.

A second step in which the strip 7 is wound about the rotating drum 2 as far as a rubber layer of a predetermined thickness is achieved.

A third step in which steel insert pieces 16 are applied to the rubber layer wound about the rotating drum 2.

A fourth step in which the winding of the rubber strip 7 on the steel insert pieces 16 occurs.

A fifth step in which the steel wire 4 is coiled around the rubber layer present on the rotating drum 2. The steel wire 4 comes from a skein 9 acting as a magazine and crosses a member 10 belonging to the feed group 3 where it is coated with an adhesive adapted to enable it to cling to the rubber better. The steel wire 4 then passes over idler wheels 11 and is wound on the rotating drum 2. The coiling of the wire 4 occurs in such a manner that one or two series of wires are formed for each track section, each of them comprising a great number of coils (twenty coils for each series of wires, for example). When two series of coils are formed, the coils are disposed on either side of a central area where, during the following molding step, the holes with which the toothed wheel of the track-laying vehicle will mesh, are created.

A sixth step in which the winding of the rubber strip 7 on the coiled steel wire 4 occurs. The winding of the rubber strip 7 only ends when a product in the form of a ring having a predetermined thickness is achieved.

It is to be noted that advantageously the machine 1, as well as the steel wire feeding group 3 and the rotating drum 2 are apparatus already known per se in the field connected with the coating of worn tires, although they have been suitably modified herein, and for this reason they are not described in detail.

At the end of the above described sixth step, there is a seventh step in which the product manufactured in the form of a ring is removed from the drum 2.

In the subsequent eighth step the product manufactured in the form of a ring is introduced into a circular mold where the ninth step regarding the forming and vulcanization operations of the ring-shaped product occurs. During this step the track is given its final configuration and in the next tenth step the track is withdrawn from the mold, ready for use.

Figure 2:
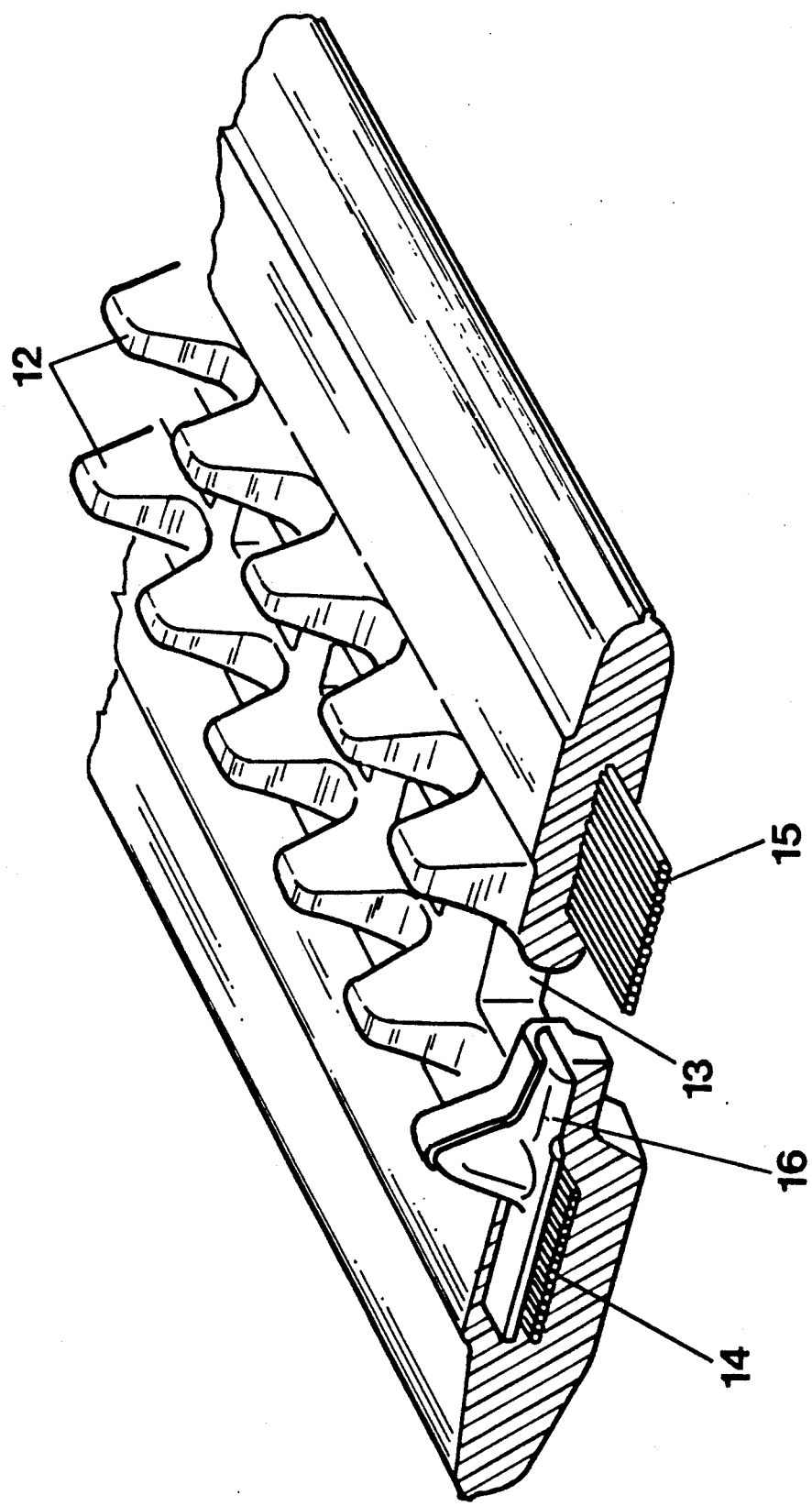
FIG. 2 diagrammatically shows a transversely sectioned portion of a track manufactured in accordance with the present invention.

Shown in FIG. 2 are the shaped ridges 12 formed on the inner part of the track as well as the above mentioned holes 13 designed for matching the toothed wheel of the track-laying vehicle. Also shown are the two series, 14 and 15, of steel wire 4 located on either side of the central area of the track and each consisting of a single steel wire 4 wound into spiral shape, as well as one of the suitably shaped steel insert pieces 16.

The invention attains the intended purposes.

Obviously the invention as conceived is susceptible of many modifications and variations depending upon requirements, all of them falling within the scope of the invention idea.

The track too can be manufactured according to forms and configurations different from theone illustrated.

In addition all of the details may be replaced by technical equivalent elements or operating parameters without departing from the scope of the invention.

What is claimed is:

1. A process for making rubber tracks comprising:
   extruding raw rubber in the form of a strip from a machine in which said raw rubber is submitted to mixing:
   winding said strip about a rotating drum to achieve a rubber layer of a predetermined thickness;
   applying steel insert pieces to said rubber layer wound about the rotating drum;
   winding said strip on the steel insert pieces;
   winding a steel wire into spiral shape around said rubber layer wound about said rotating drum;
   winding said rubber strip on coiled steel wire as a product in the form of a ring having a predetermined thickness;
   removing the product manufactured in the form of a ring from said drum;
   introducing the product manufactured in the form of a ring into a mold;
   submitting the ring-shaped product in the form of a mold to forming and vulcanization operations; and
   withdrawing the track from said mold.

2. The process as claimed of claim 1, wherein before winding said steel wire into a spiral shape the steel wire is coated with an adhesive.

* * * * *